United States Patent
Arman

[15] 3,657,762
[45] Apr. 25, 1972

[54] AUTOMOTIVE WINDSHIELD WIPER BLADE CONSTRUCTION

[72] Inventor: Dario Arman, Piazza Adriano 15, Turin, Italy

[22] Filed: Dec. 1, 1970

[21] Appl. No.: 94,147

[30] Foreign Application Priority Data

Dec. 2, 1969  Italy..................54229 A/69

[52] U.S. Cl. ........................................15/250.32
[51] Int. Cl. ..........................................B60s 1/40
[58] Field of Search............................15/250.32, 250.33

[56] References Cited

UNITED STATES PATENTS

| | | | |
|---|---|---|---|
| 3,163,877 | 1/1965 | Wubbe | 15/250.32 |
| 3,378,874 | 4/1968 | Scinta | 15/250.32 |
| 3,550,180 | 12/1970 | Arman | 15/250.32 |
| 3,593,362 | 7/1971 | Arman | 15/250.32 |

*Primary Examiner*—Peter Feldman
*Attorney*—Edwin E. Greigg

[57] ABSTRACT

The invention relates to improvements in the lateral connection members disposed between the end of the wiper arm and the wiper blade of windshield wiper devices mounted on automotive vehicles.

6 Claims, 6 Drawing Figures

Patented April 25, 1972 3,657,762
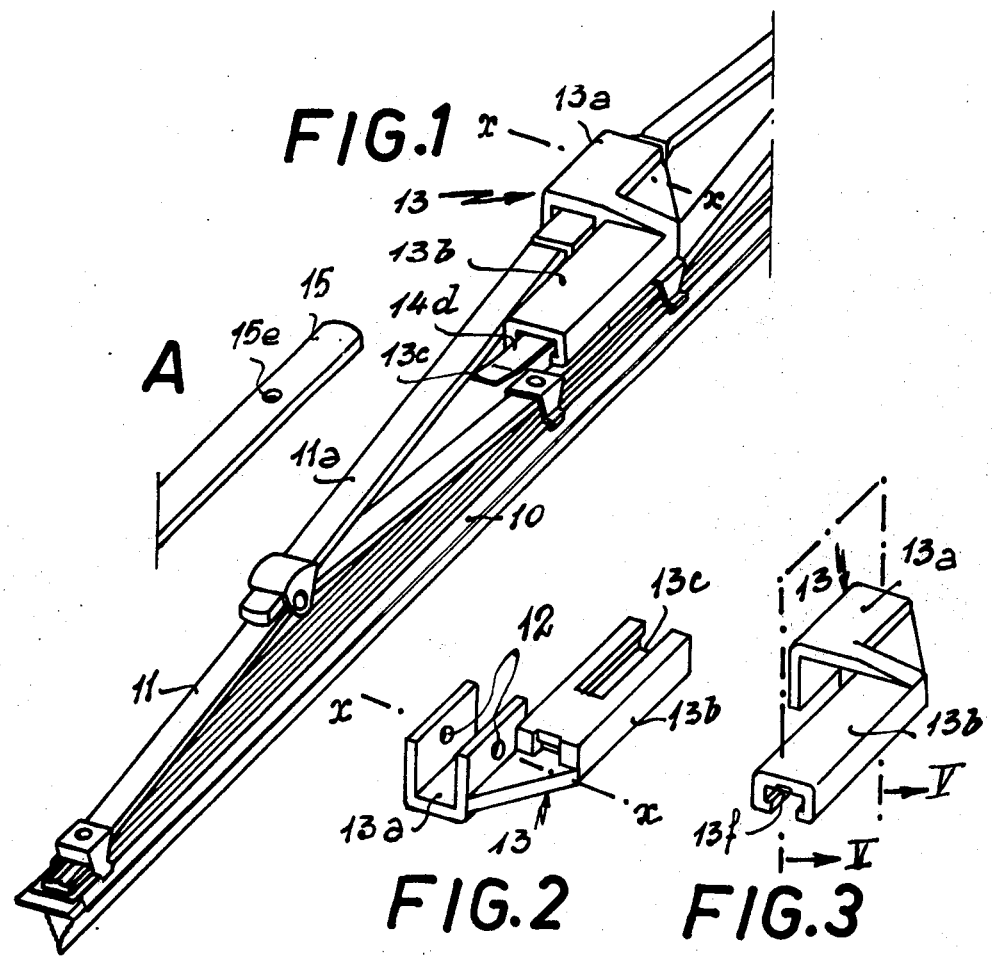
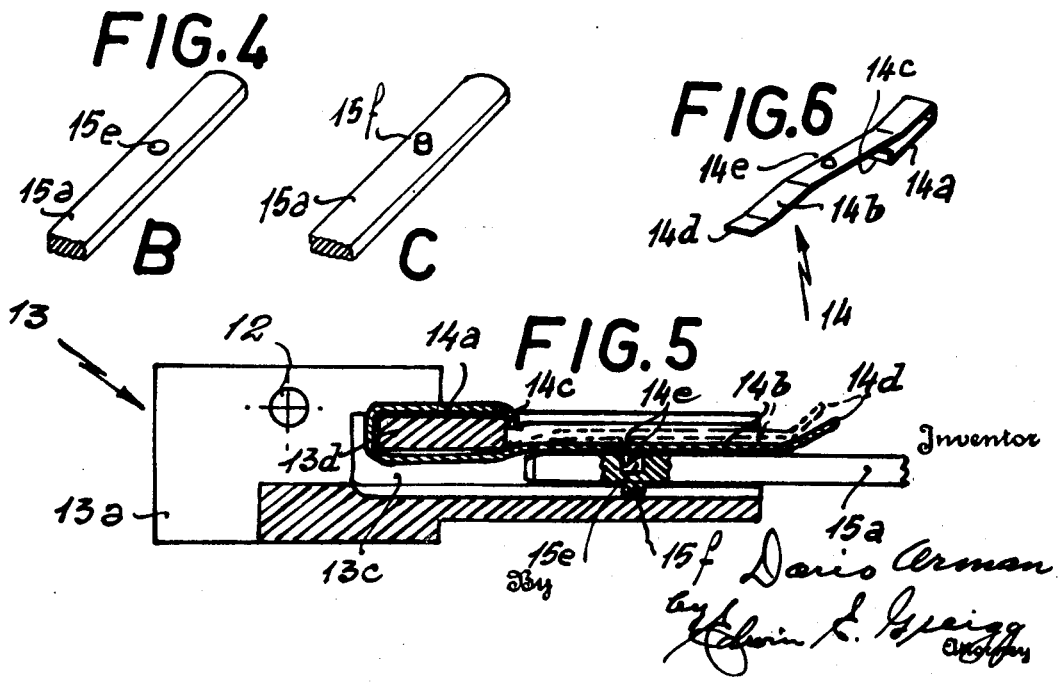
Inventor
Dario Arman
By
Edwin L. Spragg
attorney

AUTOMOTIVE WINDSHIELD WIPER BLADE CONSTRUCTION

In windshield wiper devices for automotive vehicles it is known to employ wiper blades having a releasable connection member capable of allowing one to effect association of the wiper blade in a position side by side with the corresponding actuating arm.

The purpose pursued by the use of such type of association or linkage between the wiper blade and the rocking wiper arm is to reduce the height of the device relative to the windshield surface, thus obtaining an effective wiping action as well as on account of reducing action of any aerodynamic component which tends to lift the wiper blade from the glass, particularly when the vehicle is driven at a high speed.

Also, it is known that the reduction of the overall height of the assembly comprising the wiper arm and the wiper blade is desirable, as well as in case of "completely disappearing" blades, particularly in windshield wiper devices where the wiper device in its rest position retains the blades in slits or recesses disposed at the bottom of the windshield.

In most of the known devices in which the blades are provided with a lateral connection member, the end of the rocking arm is given a particular shape in order to enable it to cooperate with a corresponding connection member projecting from the side of the blade. Obviously in such cases it is not possible to substitute the normal blades having an overlapped back connection means with blades having a side connection means without having to also substitute the rocking arms.

The main purpose of the improvement according to the present invention is to provide a blade which has a side connection and can be mounted in substitution therefor or instead of the known blades provided with an overlapped back connection without having to remove and substitute the rocking arms.

Another purpose of the improvement in accordance with the present invention is the provision of a side connection between the end of each rocking arm and the corresponding blade, which connection is effective and non-releasable spontaneously, but can be easily disengaged by operating a resilient deformable stop member.

In view of the above-mentioned purposes the lateral connection in accordance with the improvement of the present invention is characterized in that a box-type connection has a bent tile-shaped portion which is able to be linked in respect of the back reinforcement of the blade, and a second portion which is in a single body with the first one but extends side by side with it and eventually occupies a different plane in respect of the first one and serves to engagingly receive the end of the corresponding rocking arm with releasable stop means being provided between reciprocally engaging parts.

Another feature of the improvement in accordance with the present invention resides in that the stop means between the reciprocally engaging parts, that is, between the end of the rocking arm and the box-type body of the connection member, are comprised of a U-shaped steel plate having branches of different lengths and an anchoring hook obtained by bending the end of the shorter branch.

Further and more detailed features of the lateral connection in accordance with the present invention will result from the following description with reference to the annexed drawing, given only by way of example and for illustration purposes, in which:

FIG. 1 is a fragmentary perspective view of a blade which includes the connection in accordance with the present invention, and in which A indicates the end of an arm that is capable of cooperating with such connection;

FIGS. 2 and 3 are perspective views of the connection member, the view shown in FIG. 2 being turned over by 180° in respect of FIGS. 1 and 3;

FIG. 4 illustrates the ends B, C of known rocking arms;

FIG. 5 is a longitudinal vertical section, in enlarged scale, of a connection between the connection according to the present invention and the end of a rocking arm, taken along a plane passing through line V—V of FIG. 3; and FIG. 6 shows the resilient rocking arm of FIG. 5 in perspective.

Referring now to the drawing, the blade 10 shown in FIG. 1, whatever a structure its back reinforcement 11 may have, is provided with the connection member 13 pivoted respectively to the reinforcement by means of a pivot or rivet passing through the spaced apertures 12 which engages transversally the bridge 11a of the reinforcement 11 and allows the reciprocal oscillation of the blades and of the member 13 around the axis $x - x$. 1-A)

As shown in FIGS. 2, 3 and 5, the connection member 13 is formed in a single body and includes a bent tile-shaped portion 13a which is pivoted in such a way as to be able to oscillate around the top part of the bridge 11a, and a box-type part 13 in which is anchored the spring element 14 (FIG. 6) and which serves to receive, at 13c, the end 15 (FIG. 1-A) or 15a (FIG. 4-B,C) of the corresponding driving arm for the blade.

As represented in the drawing, the structure of the connection member 13 is such that the longitudinal axes of the bent tile-shaped part 13a and box-type part 13b are parallel and disposed side by side to each other. Therefore, the part 13b and the respective seat 13c, FIG. 1, are located at the lower height relative to the rubber bar 10 of the blade, hence in respect of the plane of the glass, than the part 13a which is pivoted on the back ridge 11a. Thus, when the blade or blades which are provided with a lateral connection in accordance with the invention are mounted for use, they have overall height dimensions which are considerably lesser than that when compared with normal blades having overlapped back connections.

In the recess 13c is mounted the spring 14 (FIG. 6) made of a thin steel plate. The branch 14a of this U-shaped spring is shorter than the branch 14b; furthermore, the end 14c of the short branch 14a is bent to form a hook and engages the edge 13d of the box-type part 13. The spring 14 is mounted in the box-type part 13b, as shown in FIGS. 1 and 5, with the branch 14b extending over the entire length of the seat 13c from which it projects with the bent end 14d.

The box-type part 13b includes an open portion having a C-shaped section, and a closed portion on which is anchored the flat spring 14a, 14.

Owing to the shape of the spring the long branch 14b presses against the wall or bottom 13c of the box-type part 13b. In the branch 14b of the spring is formed a pin 14e which cooperates with a corresponding seat 15e formed in the end 15 or 15a of the rocking arm.

The seat 15e, as shown in FIG. 1A, may be formed by an aperture machined adjacent to one end of the arm, or by a punching operation which, while it forms the seat 15e on one surface of the end 15a (FIG. 4B), produces a corresponding projection 15f on the oppositely disposed surface.

In order to make is possible to mount the connection according to the present invention both on the ends of the arms being provided with said seats and the ends provided with seats formed by the punching operation, in the box-type part 13b there is provided the longitudinal slot means 13f which is able to receive the projection 15f and to allow it to engagingly mount the end 15a of the arm within and in respect of the box-type part 13b, as shown in FIG. 5.

Referring to FIG. 5, the end 15a of the driving arm for the blade is inserted between the branch 14b of the spring 14 and the bottom of the box-type part 13c until the pin 14e of the spring 14 springs up in the seat 15e disposed on said end 15. The pin 14e has a right angle profile by means of which it engages the edge of the seat 15e, thus producing a click connection between the arm and the blade, which is reliable and which cannot be released spontaneously or accidentally.

To extract the end 15 of the arm from the seat 13c it is necessary to exert effort upon the flat spring 14 by engaging it at the end 14d and deforming it elastically, such as shown by the dashed lines in FIG. 5. In so doing, the pin 14e of the spring 14 disengages from the hollow seat 15e of the arm end 15 and thereby allows the release of the box-type part 13 and the end of the arm, that is, it allows the separation of the blade, which is linked on the member 13, from the corresponding driving arm.

The advantages of the connection in accordance with the present invention appear clear from the description hereinbefore described, which advantages may be summarized as follows:

possibility to manufacture windshield wiper devices with completely or partially disappearing blades;

possibility to use blades provided with the connection means according to the present invention in combination with normal driving arms, whether they are provided with a hollow seat formed by a transversally arranged aperture or with a seat obtained by a punching process;

possibility to substitute for the normal blades, particularly on automotive vehicles capable of developing high speed, blades having the lateral connection according to the present invention, in order to reduce the aerodynamic effect tending to raise the blades from the plane of the glass;

characteristic shape of both the connection and the flat spring 14 which is anchored on the box-type part 13, by virtue of its configuration and of the terminal hook 14c, without having to employ additional stop means.

That which is claimed is:

1. The improvement in windshield devices for automotive vehicles to provide for connections between the end of an arm and a wiper blade in which the driving arm of each wiper blade is disposed side by side with and parallel to the blade, characterized by an intermediate member for the lock connection between the end of the arm and the corresponding blade, said member being linked on the back bridge of the blade and being provided with a box-type part provided with an internal flat spring having a stop means which cooperates with a corresponding hollow seat formed on the end of the corresponding driving arm, thereby to be able to be engagingly connected within and in respect of said box-type part of said intermediate member.

2. The improvement according to claim 1, characterized in that the intermediate connection member between the back bridge of the blade and the end of the driving arm is constructed of a single body and includes two distinct parts, the first of said parts being bent tile shaped and linked, by transversal pivoting, on the back bridge of the blade, and the second of said parts being substantially box-type shaped and including a longitudinal axis parallel to the longitudinal axis of the bent tile shaped part and further including a flat spring having a stop pin to engage a corresponding hollow seat disposed in the end part of the driving arm which engages in said box-type part.

3. The improvement according to claim 1, characterized in that in the box-type part is anchored a flat spring having a hook-shaped end arranged to engage a transversal bridge of said box-type part, the other end projecting from the engaging seat disposed on said box-type part to receive the end of the driving arm.

4. The improvement according to claim 3 in which the spring is U-shaped and has at least two branches of different lengths, the shorter of said branches being anchored within and in respect of the box-type part of the member which is linked on the back bridge of the blade, and the longer of said branches, which is provided with a pin and capable of cooperating with a corresponding recess disposed on the end part of the arm which may engage the box-type part, being provided with a bent end to actuate the spring in order to release the engaged parts.

5. The improvement according to claim 1, in which the box-type part of the member linked on the back of the blade is provided with a longitudinal channel able to receive a projection disposed on the end of the driving arm.

6. The improvement according to claim 1, characterized in that the intermediate member which is linked on the back bridge of the blade is provided with a seat for the end of the driving arm and by virtue of its structure transfers the engaging seat for the end of said arm from the known position overlapping the back bridge of the blade to a position side by side with the latter, thus reducing the overall height dimension of the blade relative to the automotive windshield.

* * * * *